United States Patent [19]

Heidorn et al.

[11] Patent Number: 5,606,489

[45] Date of Patent: Feb. 25, 1997

[54] GANGED IROB IN RANGE OUT OF BUILDING PROTECTOR

[75] Inventors: Richard H. Heidorn, Lombard; Mohammad Masghati, Addison, both of Ill.

[73] Assignee: Illinois Tool Works Inc., Glenview, Ill.

[21] Appl. No.: 451,673

[22] Filed: May 26, 1995

[51] Int. Cl.⁶ ........................................ H01R 9/00
[52] U.S. Cl. .......................... 361/824; 361/796; 361/823; 361/837; 174/50
[58] Field of Search ...................... 361/752, 796, 361/815, 824, 819, 820, 833, 834, 835, 837, 829; 379/412, 331, 399; 211/26; 174/50

[56] References Cited

U.S. PATENT DOCUMENTS

| | | | |
|---|---|---|---|
| 4,800,465 | 1/1990 | Rodgers et al. | 361/432 |
| 4,924,345 | 5/1990 | Siemon et al. | 361/111 |
| 4,932,051 | 6/1990 | Karan et al. | 379/399 |
| 5,222,131 | 6/1993 | Heidorn et al. | 379/412 |

*Primary Examiner*—Leo P. Picard
*Assistant Examiner*—Y. Whang
*Attorney, Agent, or Firm*—Schwartz & Weinrieb

[57] ABSTRACT

A multiple circuit building protector assembly for protecting telephone communication related equipment includes a two-piece interfitting housing, a printed circuit board sub-assembly, a plurality of first modular jacks connected to an exposed side, and a plurality of second modular jacks connected to a protected side. The printed circuit board is fixedly mounted internally of the housing and is adapted to receive a variety of different overvoltage and/or overcurrent protective circuit devices. A plurality of plug-in fuse modules are disposed in top recesses of the housing cover member.

23 Claims, 4 Drawing Sheets

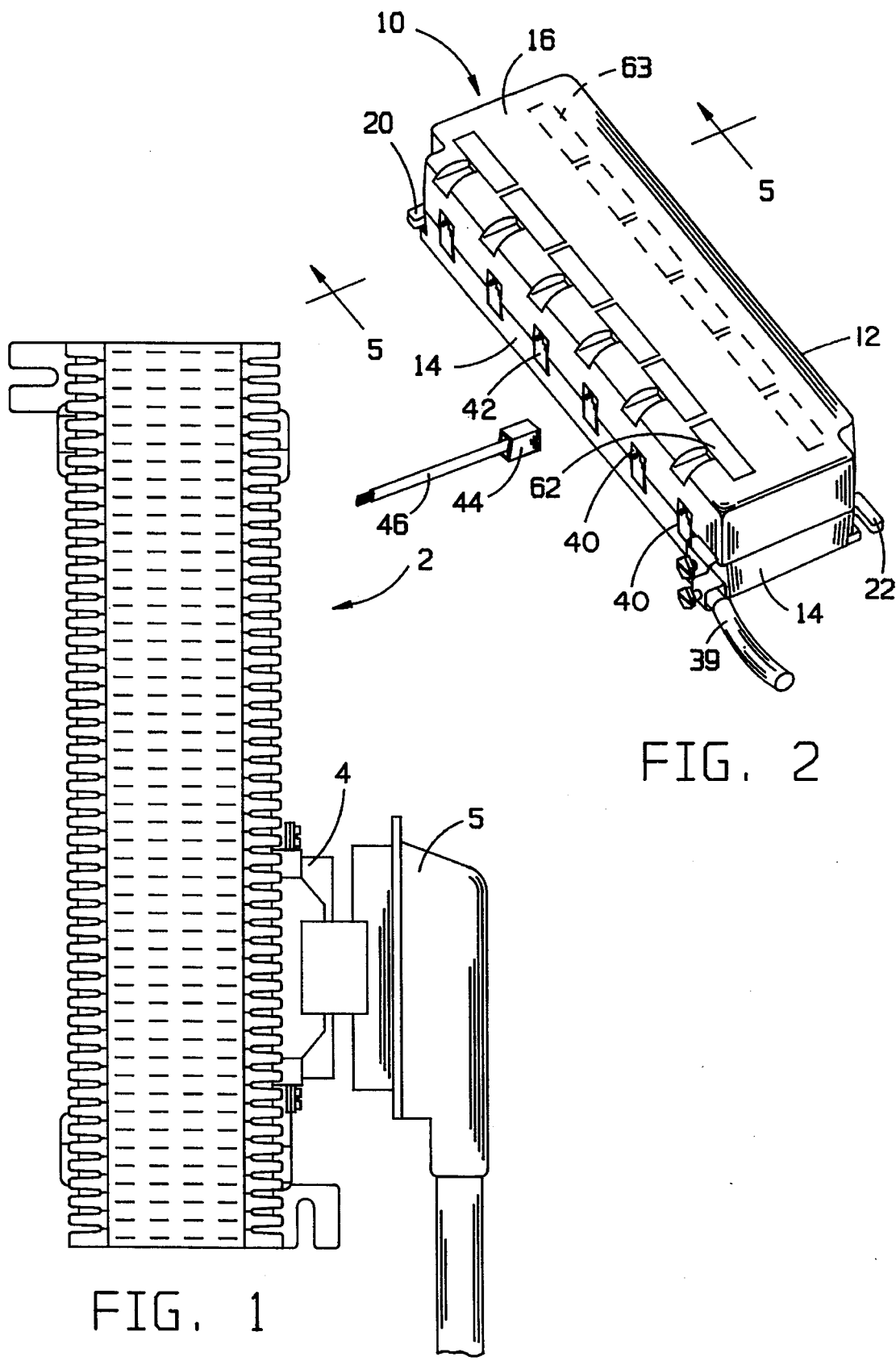

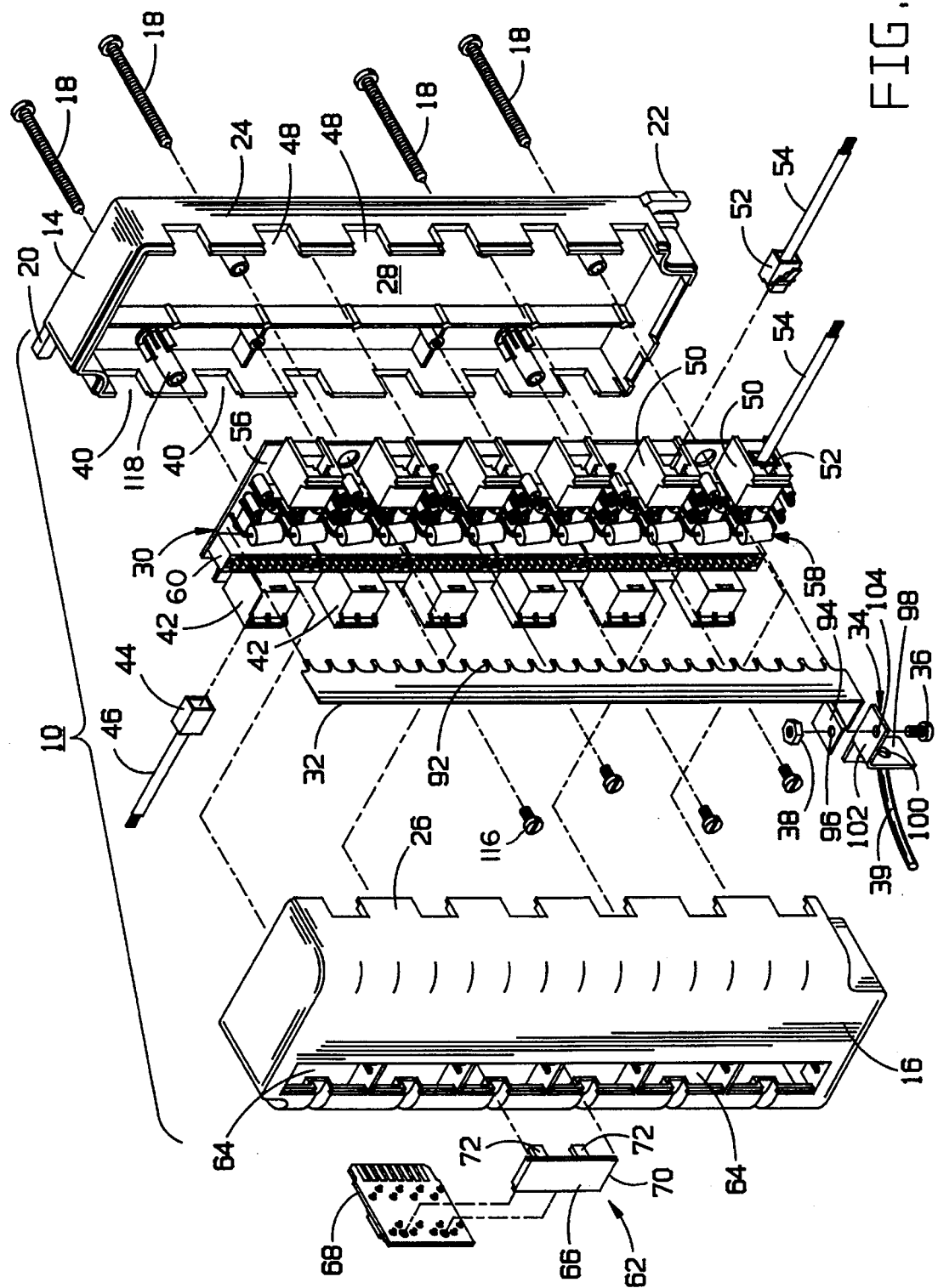

GANGED IROB IN RANGE OUT OF BUILDING PROTECTOR

FIELD OF THE INVENTION

This invention relates generally to telephone protector packages and more particularly, it relates to a multiple-circuit building protector assembly having a two-piece interfitting housing which receives a printed circuit board for mounting a variety of different overvoltage and/or overcurrent protective circuit devices, a plurality of first modular jacks connected to an exposed side, a plurality of second modular jacks connected to a protected side, and a plurality of plug-in fuse modules for protecting telephone communication related equipment and the like.

BACKGROUND OF THE INVENTION

The protective circuit devices generally include a plurality of fuses so as to protect such a telephone equipment from power surges. In the event of such power surge, the fuses will become "blown" or open so that the connection between the power input line and the equipment to be protected is interrupted, thereby saving the equipment from damage. However, once the fuses have been "blown" there is required the time-consuming task of replacing the blown fuses with new fuses which can sometimes entail the rather difficult job of locating the "blown" fuses and inserting the new fuses into the telephone equipment.

Heretofore, it was known in the prior art to provide plug-in fuse structures for use with telephone terminal blocks so as to plug directly into the terminals thereof for protecting against surge currents. Examples of such plug-in fuse structures are disclosed in U.S. Pat. Nos. 4,800,465; 4,924,345; and 5,222,131.

U.S. Pat. No. 4,800,465 to E. W. Rodgers et al. issued on Jan. 24, 1989, discloses a mounting plate 34 for supporting one or more fuse blocks to a telephone equipment bay frame 20. The mounting plate is adapted to support one or more 8-pin fuse blocks 68, one or more 16-pin fuse blocks 104 or combinations thereof.

U.S. Pat. No. 4,924,345 to J. A. Siemon et al. issued on May 8, 1990, teaches a combined transient voltage and sneak current protector 10 which includes a two-piece substantially rectangular insulative housing 12. The housing has four spaced and aligned openings 30–36 at the bottom 38 thereof for receiving upstanding terminals from a terminal block. The interior of the housing is loaded with four contact members which are adapted to effect electrical connection with a three element surge suppressor and a pair of cylindrical fuse elements 62 and 64. The top surface of the housing 12 includes a handle 88 for assisting in its insertion into and retraction from the terminal block.

In U.S. Pat. No. 5,222,131 to R. H. Heidorn et al. issued on Jun. 22, 1993, and assigned to the same assignee of the present invention, there is disclosed a telephone protector 10 which is contained within a housing 12 having an input connection 36 and an output connection 38. The protector has an externally accessible fuse compartment 48 having 60 fuse contact pairs. A removable fuse holder 14 is formed of substantially U-shaped cover member 74 bearing a plurality of fuse sockets 92. The cover member 74 is comprised of a base 78 and a pair of legs 80, each having a tang 70. The tangs are engageable with notches 68 formed in opposed panels of the housing so as to lock the cover member 74 onto the housing. The fuse holder 14 is capable of only holding a maximum of 8 or so fuses and thus can only be used to protect a limited number of electronic circuits.

In recent years, the telephone communication industry has demanded that relatively large multi-contact connectors be used for hard-wiring the incoming telephone lines and the telephone instrument station cables may include 25 wire-pairs. As is generally known in the art of telephone communication, there has been used extensively a certain connection block referred to sometimes as a "66-M type terminal connector block" that provides rapid wire installation of key telephone systems, PBX systems, cables and other low voltage terminal equipment. Typically, these 66-M type terminal blocks are mounted on a standoff bracket and serve as an interface with the user provided equipment. Further, the users are generally required to mount a connector(s) on the side(s) or bottom of the bracket so as to interface with the 66-M type terminal block. In FIG. 1, there is illustrated a conventional 66-M terminal block 2 of the prior art with a connector 4 connected to its one side and the figure has been labeled "Prior Art." These side connectors are frequently difficult to connect and disconnect from a plug 5 during installation and repair. In addition, if the protection devices were necessary, this required additional labor for installing the same to the 66-M type terminal block. These protection devices were generally specially-designed separate assemblies which had to be connected to the terminal block, that is, they were, plug-in type assemblies.

The present invention represents improvements over the conventional 66-M type terminal block used in telephone equipment and other communication applications as well as improvements over the above-discussed patents and in particular with respect to the '131 patent that could only protect a relatively small number of electronic circuits. In the present invention, the housing has been designed to fit into the same footprint as that of the conventional 66-M type terminal block. The printed circuit board is fixedly mounted internally of the housing and is adapted to receive a variety of different overvoltage and/or overcurrent protective circuit devices so as to provide the kind of electrical protection desired. Further, the housing is adapted to receive a plurality of first modular jacks connected to its exposed side and a plurality of second modular jacks connected to its protected side. Each of the plurality of first and second modular jacks is preferably of the type for a 4 wire-pair telephone line cord known as a RJ-45 jack so as to facilitate quick and easy mechanical connections to the protective circuit devices. A plurality of plug-in fuse modules are disposed in top recesses formed in the housing cover so as to protect the telephone communication related equipment and the like against a power surge. Each of the fuse modules is comprised of a fuse card holder and a miniature printed circuit board containing a plurality of fuses.

OBJECTS OF THE INVENTION

Accordingly, it is a general object of the present invention to provide a novel and improved multiple-circuit building protecting assembly which is relatively simple and economical to manufacture and assemble.

It is an object of the present invention to provide a multiple-circuit building protector assembly having a two-piece interfitting housing for receiving a printed circuit board for mounting a variety of different overvoltage and/or overcurrent protective circuit devices, a plurality of first modular jacks connected to an exposed side, a plurality of second modular jacks connected to a protected side, and a plurality of plug-in fuse modules.

It is another object of the present invention to provide a multiple-circuit building protector assembly which is characterized by a design which greatly facilitates the replacement of new fuses into telephone communication equipment.

It is still another object of the present invention to provide a multiple-circuit building protector assembly which is particularly useful for purposes of fitting into the footprint of a 66-M type terminal block for receiving a plurality of different overvoltage and/or overcurrent protective circuit devices and a plurality of plug-in fuse modules disposed in top recesses of a housing cover.

SUMMARY OF THE INVENTION

In a preferred embodiment of the present invention, there is provided a multiple-circuit building protector assembly for protecting telephone communication related equipment and the like which includes a housing formed of co-mating base and cover members. The base and cover members have outer confronting side wall members. The side wall members of the base member are recessed so as to form a cavity for receiving and enclosing a printed circuit board sub-assembly. The printed circuit board sub-assembly is disposed within the housing for mounting a plurality of protective circuit devices.

A plurality of first modular jacks are mounted on one side of the printed circuit board sub-assembly and are adapted to receive modular plugs connected to incoming telephone lines. A plurality of second modular jacks are mounted on the other side of the printed circuit board sub-assembly and are adapted to receive modular plugs connected to individual telephone line cords. A plurality of plug-in fuse modules are disposed within a top surface of the cover member.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, and wherein:

FIG. 1 is a front plan view of a conventional 66-M type terminal block of the prior art;

FIG. 2 is a perspective view of a multiple-circuit building protector assembly, constructed in accordance with the principles of the present invention;

FIG. 4 is an exploded perspective view of the building protector assembly of FIG. 2;

DESCRIPTION OF THE ILLUSTRATED EMBODIMENTS

Figure 3:
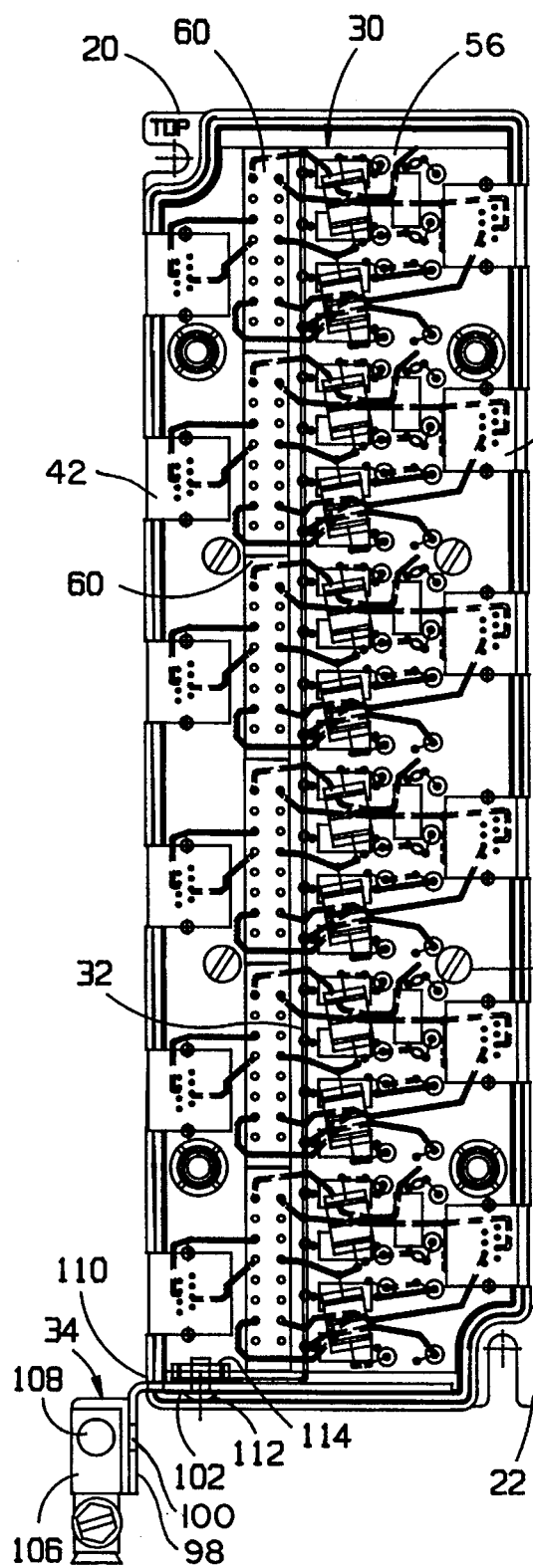
FIG. 3 is a top plan view of FIG. 2, with the housing cover removed.
Figure 5:
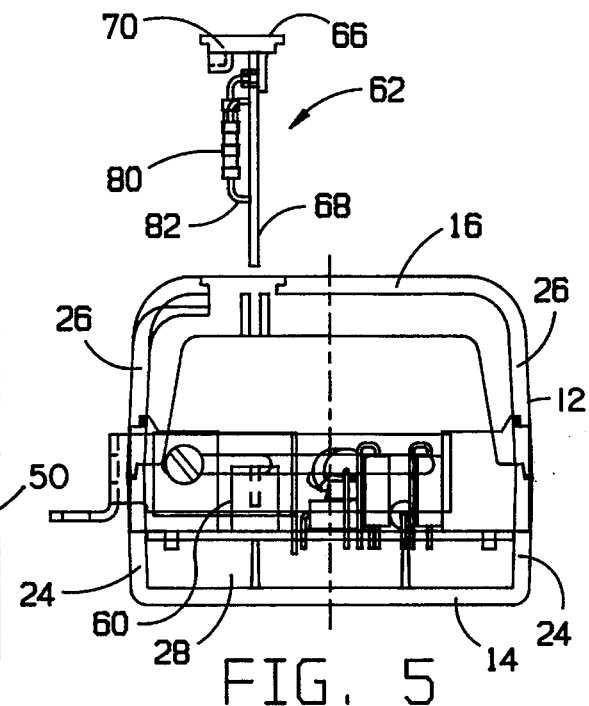
FIG. 5 is a cross-sectional view taken along the lines 5—5 of FIG. 2.

Referring now in detail to the various views of the drawings and in particular to FIGS. 2 through 7, there is illustrated a multiple-circuit building protector assembly of the present invention which is designated generally by reference numeral 10 and which suitably fits into the footprint of a 66-M type terminal connector block 2 (as shown in FIG. 1) which is in common use in telephone communication related equipment and other electronic applications. The protector assembly 10 is utilized to protect sensitive communication equipment up to 24-pairs of wires (48 lines) from transient overvoltage and/or overcurrent conditions for each pair of wires. The protector assembly 10 may be used as a network interface in a multitude of customer applications because it can provide a variety of circuit protection options so as to protect against the different types of threats that is, overvoltage and/or overcurrent. Further, the protector assembly facilitates quick and easy mechanical connections to the protective circuit devices because it can accommodate a plurality of first and second modular jacks formed on its respective exposed side and protected side.

The building protector assembly 10 includes a molded housing 12 made of a suitable plastic, such as polycarbonate and the like which is comprised of a co-mating base member 14 and a cover member 16. The cover member 16 can be secured to and interlocks with the base member 14 by a plurality of captive screws 18. When the cover member 16 is removed from the base member, 14 the captive screws 18 are designed so as to be retained in the base member 14. The housing 12 has a generally rectangular configuration and is adapted to be mounted into the footprint of the 66-M terminal block by means of upper and lower mounting projections 20 and 22.

The base and cover members 14 and 16 are provided with outer confronting side wall members 24 and 26, respectively. The two side wall members 24 of the base member 14 are recessed so as to form a cavity 28 for receiving and enclosing a printed circuit board sub-assembly 30. An elongated ground bar 32 is provided, for reasons that will become apparent so as to interfit with the printed circuit board sub-assembly 30. A ground bar extension 34 has its one end connected to the ground bar 32 by means of screw 36 and a nut 38. The other end of the ground bar extension 34 extends from the side of the housing 12 so as to be used for bolting directly to a grounded frame system (not shown) set up for the 66-M terminal block or for connection to an external common grounded bus (also not shown) by means of a wire 39.

The base member 14 includes a plurality of connector-receiving openings 40 which are formed in the left or exposed side of the base member. The connector-receiving openings 40 are formed of a substantially rectangular shape and are adapted to receive a corresponding one of a plurality of standardized modular jacks 42. Each of the modular jacks 42 is preferably an 8-position jack for terminating a 4 wire-pair telephone line cord and is sometimes referred to as a RJ-45 jack. Each of the modular jacks 42 can receive a standardized modular plug 44 connectible to incoming telephone lines of a telephone trunk cable (not shown) from either central office equipment outside the service area or from a distribution panel within the building by means of a corresponding telephone line 46. The modular jacks 42 provide for quick and easy mechanical connections to the protective circuit devices located on the printed circuit board sub-assembly 30.

Further, the base member 14 includes a plurality of connector-receiving openings 48 which are formed in the right or protected side of the base member. The connector-receiving openings 48 are formed of a substantially rectangular shape and are adapted to receive a corresponding one of a plurality of standardized jack modules 50. Each of the modular jacks 50 is preferably an 8-position jack (that is, RJ-45) for terminating a 4 wire-pair telephone line cord. Each of the modular jacks 50 can receive a standardized modular plug 52 connectible to individual telephone equipment (not shown) by means of a corresponding telephone line 54.

The printed circuit board sub-assembly 30 includes a printed circuit board 56 and a plurality (24) of protective circuit devices 58. Each of the protective circuit devices 58 may be optionally formed as shown in any one of the schematic circuit diagrams of FIGS. 8, 9, 10, or 11.

Figure 8:
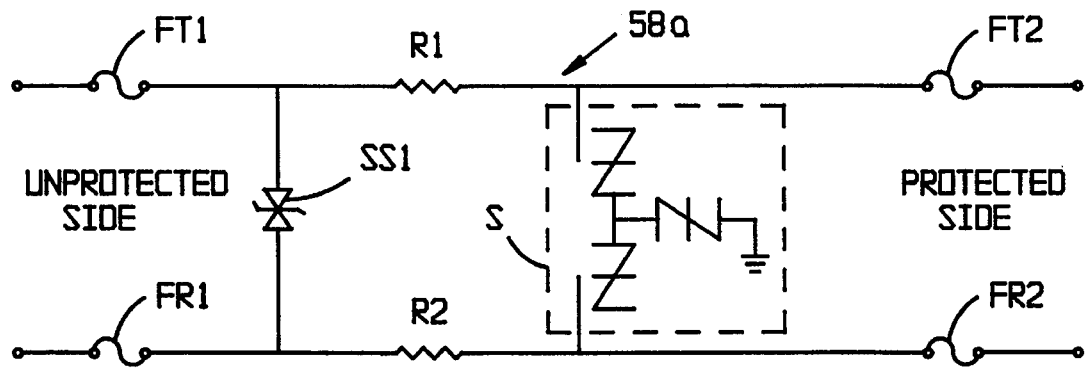
FIG. 8 is a schematic circuit diagram of a protective circuit device, according to a first embodiment.

In FIG. 8 of the drawings, there is illustrated a schematic circuit diagram of the protective circuit device 58a, constructed in accordance with a first embodiment of the present invention. In particular, the protective circuit device 58a includes a first pair of sneak current fuses FT1 and FR1 for the exposed side, a second pair of sneak current fuses FT2 and FR2 for the protected side, a pair of current-limiting resistors R1 and R2, a solid-state suppressor SS1, and a sidactor S so as to provide both overvoltage and overcurrent protection.

Figure 9:
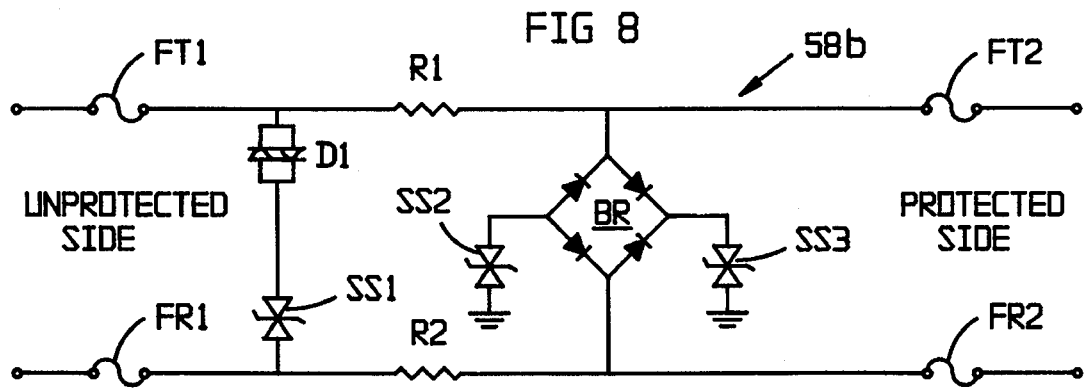
FIG. 9 is a schematic circuit diagram of a protective circuit device, according to a second embodiment.

In FIG. 9 of the drawings, there is illustrated a schematic circuit diagram of the protector circuit device 58b constructed in accordance with a second embodiment of the present invention. As can be seen, the circuit device 58b of the second embodiment is substantially identical to the first embodiment of FIG. 8, except that the sidactor S has been replaced with a pair of solid-state suppressors SS2, SS3, and a diode bridge rectifier BR, and that a diac D1 has been placed in series with the solid-state suppressor SS1.

Figure 10:
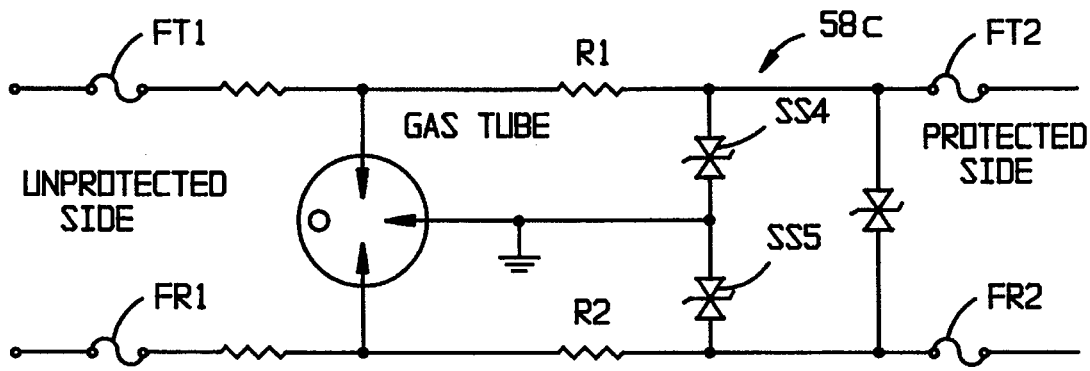
FIG. 10 is a schematic circuit diagram of a protective circuit device, according to a third embodiment.

In FIG. 10 of the drawings, there is illustrated a schematic circuit diagram of the protective circuit device 58c, constructed in accordance with a third embodiment of the present invention. As will be noted, the circuit device 58c of the third embodiment is substantially identical to the first embodiment of FIG. 8, except that the solid-state suppressor SS1 has been replaced by two suppressors SS4 and SS5, and that the sidactor S has been replaced by a gas-tube.

Figure 11:
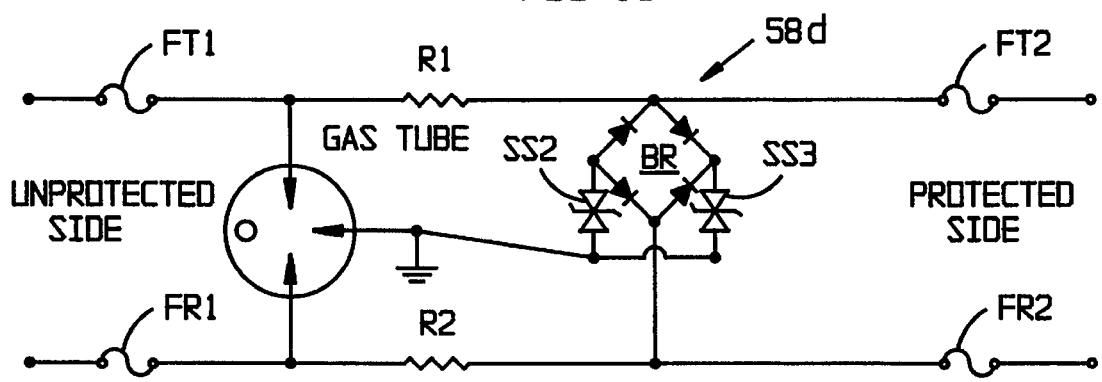
FIG. 11 is a schematic circuit diagram of a protective circuit device, according to a fourth embodiment.

In FIG. 11 of the drawings, there is illustrated a schematic circuit diagram of the protector circuit device 58d, constructed in accordance with a fourth embodiment of the present invention. As can be seen, the circuit device 58d of the fourth embodiment is substantially identical to the second embodiment of FIG. 9, except that the diac D1 and the solid-state suppressor SS1 have been replaced by a gas-tube.

There is provided a plurality (6) of card edge connectors 60 which are mounted on the printed circuit board sub-assembly 30. The card edge connectors 60 are similar to those commercially available from Amp Incorporated of Harrisburg, Pa., under their Part No. 534206-2. Each of the card edge connectors 60 is adapted to receive a corresponding one of a plurality of fuse card modules 62. The fuse card modules 62 are designed for plug-in assembly into the card edge connector 60 through the rectangularly-shaped aperture 64 formed in the top surface of the cover member 16.

Specifically, each of the fuse card modules 62 is comprised of a fuse card holder 66 and a miniature printed circuit board 68. The card holder 66 is preferably made of a plastic material and includes a rectangularly-shaped body portion 70 which is designed to fit substantially flush within the aperture 64 of the cover member 16. On the bottom side of the body portion 70, there is formed a plurality of downwardly-extending, spaced-apart legs 72 having a post 74 projecting perpendicularly therefrom. On the bottom side of the body portion 70 opposite the pair of legs 72, there is provided a lug portion 76 having a recess 78 to receive a tool or the like of a user for facilitating removal of the card module 62 from the card edge connector 60.

Figure 6:
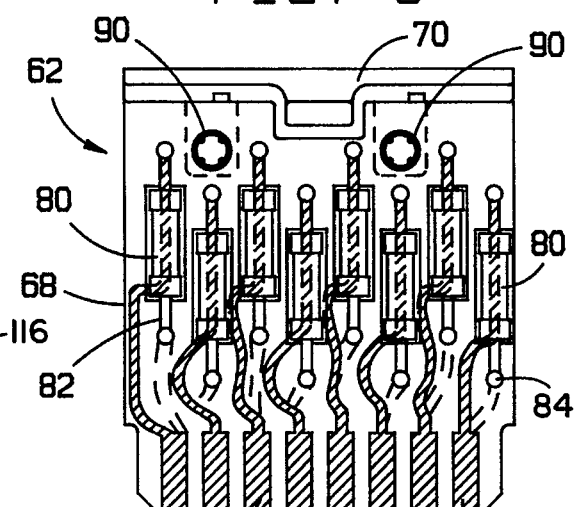
FIG. 6 is an enlarged view of one of the plug-in fuse modules.
Figure 7:
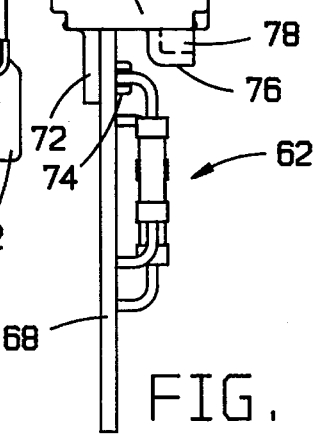
FIG. 7 is a side elevational view of the fuse module of FIG. 6.

The miniature printed circuit board 68 houses eight (8) fuses 80 each having leads 82 which are insertable into eyelets 84 formed in the printed circuit board 68. The fuse leads 82 are preferably wave soldered to the printed circuit board 68 so as to securely mount the same thereon. Each lead 82 of the fuses 80 is suitably connected to a metallic trace 86 to the terminal connector leads 88 formed on the one edge of the board. On the opposite edge, there are provided a pair of opposed openings 90 which are aligned so as to receive the respective posts 74 on the legs 72 of the card holder 66 in order to form the assembled card module 62, as shown in FIGS. 6 and 7.

When the protective circuit devices 58 include components which provide overvoltage protection, the ground bar 32 and the ground bar extension 34 are required so as to interconnect the printed circuit board 56 to the external common ground bus. As can be seen from FIGS. 3 and 4, the elongated ground bar 32 is substantially rectangular in shape and has a relatively narrow width. The ground bar 32 is preferably formed of a metallic material such as stainless steel and the like. On the lower side of the ground bar 32, there are provided a plurality of comb-like projections 92 which are used for mounting to the printed circuit board 56. At its lower end, there is integrally formed a small connecting portion 94 having an aperture 96 therein.

The ground bar extension 34 includes a body portion 98 having an opening 100. At the upper end of the body portion 98, there is provided an offset 102 which extends horizontally therefrom at a right angle. The offset 102 is formed with a hole 104. At the bottom side of the body portion 98, there is also integrally connected thereto a horizontal flange 106 which extends outwardly therefrom at a right angle. The horizontal flange 106 is formed with an opening 108. The opening 100 in the body portion 98 and the opening 108 in the horizontal flange 106 are used to facilitate connection to the external common ground bus. The ground bar extension 34 is likewise preferably formed of a metallic material such as stainless steel. The offset 102 extends through an opening 110 formed in the housing 12, and a screw 112 is inserted through the hole 104 in the offset 102 and through the aperture 96 in the ground bar 32. A nut 114 is threaded onto the screw 112 for securing the ground bar 32 and the ground bar extension 34 together.

In assembly, all of the electronic components of the protective circuit devices that is, 58a–58b, except for the fuse modules and their components, the modular jacks 42, 50 on the exposed side and the protected side, the card edge connectors 60, and the ground bar 32 with the ground bar extension 34 are mounted on the printed circuit board 56 and then soldered to the printed circuit board 56 so as to form the printed circuit board sub-assembly 30 as shown in FIG. 4. The printed circuit board sub-assembly 30 is fixedly mounted by screws 116 to the base member 14 of the housing 12 as illustrated in FIG. 3. Next, the cover member 16 is placed over the base member 14, and the screws 18 are inserted into openings 118 formed in the bottom surface of the base member 14 for threaded engagement into aligned holes 120 disposed in the underneath surface of the cover member 16 so as to sandwich the printed circuit board sub-assembly 30 therebetween.

In a separate assembly operation, the plurality of fuses 80 are mounted on the miniature printed circuit board 68 and are then wave soldered to the printed circuit board 56. Next, the posts 74 on the legs 72 of the fuse card holders 66 are inserted into the respective openings 90 of the miniature printed circuit board 68 so as to form the fuse card modules 62. In this manner, the plurality of plug-in fuse modules 62 are formed as depicted in FIG. 2. Finally, each of the fuse modules 62 is inserted through the recesses 64 in the top surface of the cover member 16 and into electrical connection with the corresponding card edge connectors 60. As a result, the building protector assembly 10 of FIG. 1 is formed in its fully assembled condition.

In an alternative embodiment, there can be optionally provided a plurality of fuse card modules 63 shown in dotted lines disposed in recesses on the protected side (right side of the cover member 16 in FIG. 2) of the printed circuit board sub-assembly 30. It should be understood by those skilled in the art that the current fuses associated with the protected side in the schematic diagrams of FIGS. 8–11 would be positioned on the fuse card modules 63.

From the foregoing detailed description, it can thus be seen that the present invention provides a multiple-circuit building protector assembly for protecting telephone communication related equipment and the like which includes a two-piece interfitting housing for receiving a printed circuit board, a plurality of first modular jacks connected to an exposed side, and a plurality of second modular jacks connected to a protected side. The housing is designed to fit into the same footprint as that of the conventional 66-M type terminal block. The printed circuit board is fixedly mounted internally of the housing and is adapted to receive a variety of different overvoltage and/or overcurrent protective circuit devices. Further, a plurality of plug-in fuse modules are disposed in top recesses of the housing cover member.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A multiple-circuit building protector assembly for protecting telephone communication related equipment and the like, comprising:

a housing formed of co-mating base and cover members, said base and cover members having outer confronting side wall members, said side wall members of said base member being recessed so as to form a cavity;

a printed circuit board sub-assembly disposed within said cavity of said housing;

a plurality of protective circuit devices mounted upon said printed circuit board sub-assembly disposed within said cavity of said housing;

a plurality of first modular jacks mounted upon one side of said printed circuit board sub-assembly for receiving modular plugs connected to incoming telephone lines;

a plurality of second modular jacks mounted upon another side of said printed circuit board sub-assembly for receiving modular plugs connected to individual telephone line cords; and a plurality of plug-in fuse modules disposed within a top surface portion of said cover member.

2. A building protector assembly as claimed in claim 1, wherein said housing is adapted to fit into the footprint of a conventional 66-M terminal block.

3. A building protector assembly as claimed in claim 2, wherein each one of said plurality of first modular jacks is comprised of a RJ-45 jack.

4. A building protector assembly as claimed in claim 3, wherein each one of said plurality of second modular jacks is comprised of a RJ-45 jack.

5. A building protector assembly as claimed in claim 4, wherein each one of said plurality of protective circuit devices is comprised of at least one overcurrent protection means and overvoltage protection means.

6. A building protector assembly as claimed in claim 5, further comprising ground bar means including an elongated ground bar extending inside and along the length of said housing for connection to said plurality of protective circuit devices when said overvoltage protection means is provided, and a ground bar extension being connected to said elongated ground bar and extending externally of said housing.

7. A building protector assembly as claimed in claim 1, wherein each one of said fuse modules is comprised of a fuse card holder and a miniature printed circuit board secured thereto, said miniature printed circuit board supporting a plurality of fuses thereon.

8. A building protector assembly as claimed in claim 7, further comprising a plurality of card edge connectors mounted on said printed circuit board subassembly and including a plurality of contacts for effecting electrical connections with a corresponding one of said miniature printed circuit boards.

9. A building protector assembly as claimed in claim 8, wherein each one of said fuse card holders includes a body portion and a pair of spaced-apart legs each having a post formed thereon, said post being adapted for engagement with openings formed in the upper end of said miniature printed circuit board so as to form said fuse module.

10. A building protector assembly as claimed in claim 9, wherein each one of said fuse card holders is formed of a plastic material.

11. The assembly as set forth in claim 1, wherein:

said housing has aperture means defined within opposite sides thereof for permitting ingress of said modular plugs of said incoming telephone lines into said housing and for permitting egress of said modular plugs of said individual telephone line cords out of said housing.

12. A multiple-circuit building protector assembly for protecting telephone communication related equipment and the like, comprising:

a housing formed of co-mating base and cover members, said base and cover members having outer confronting side wall members, said side wall members of said base member being recessed so as to form a cavity therein;

a printed circuit board sub-assembly disposed within said cavity said housing;

a plurality of protective circuit devices mounted upon said printed circuit board sub-assembly disposed within said cavity of said housing;

first modular jack means operatively associated with an exposed side of said housing for supplying 24-pairs of wires to said printed circuit board sub-assembly;

second modular jack means operatively associated with a protected side of said housing for receiving said 24-pairs of wires from said printed circuit board subassembly; and plug-in fuse module means operatively associated with said exposed side of said housing.

13. A building protector assembly as claimed in claim 12, further comprising plug-in fuse module means operatively associated with said protected side of said housing.

14. A building protector assembly as claimed in claim 12, wherein said housing is adapted to fit into the footprint of a conventional 66-M terminal block.

15. A building protector assembly as claimed in claim 14, wherein said first modular jack means is comprised of a plurality of RJ-45 jacks.

16. A building protector assembly as claimed in claim 15, wherein said second modular jack means is comprised of a plurality of RJ-45 jacks.

17. A building protector assembly as claimed in claim 16, wherein each one of said plurality of protective circuit devices is comprised of at least one overcurrent protection means and overvoltage protection means.

18. A building protector assembly as claimed in claim 12, wherein said fuse module means comprises a plurality of fuse modules each one of which is comprised of a fuse card holder and a miniature printed circuit board secured thereto, said miniature printed circuit board supporting a plurality of fuses thereon.

19. A building protector assembly as claimed in claim 18, further comprising a plurality of card edge connectors mounted on said printed circuit board subassembly and including a plurality of contacts for effecting electrical connections with a corresponding one of said miniature printed circuit boards.

20. The assembly as set forth in claim 12, wherein:

said housing has aperture means defined within opposite sides thereof for permitting ingress of incoming telephone line modular plugs for connection to said first modular jack means, and for permitting egress of individual telephone line cord modular plugs connected to said second modular jack means.

21. A multiple-circuit building protector assembly for protecting telephone communication related equipment and the like, comprising:

housing means formed of co-mating base and cover members;

printed circuit board means disposed within said housing means;

a plurality of protective circuit means mounted upon said printed circuit board means;

first modular jack means operatively connected to an exposed side of said housing means for supplying 24-pairs of wires to said printed circuit board means;

second modular jack means operatively connected to a protected side of said housing means for receiving said 24-pairs of wires from said printed circuit board means; and plug-in fuse module means operatively associated with said exposed side of said housing means.

22. A building protector assembly as claimed in claim 21, wherein said fuse module means is comprised of a fuse card holder and a miniature printed circuit board secured thereto, said miniature printed circuit board supporting a plurality of fuses thereon.

23. The assembly as set forth in claim 21, wherein:

said housing has aperture means defined within opposite sides thereof for permitting ingress of incoming telephone line modular plugs for connection to said first modular jack means, and for permitting egress of outgoing individual telephone line cord modular plugs connected to said second modular jack means.

* * * * *